US012576697B1

(12) United States Patent
Shi

(10) Patent No.: US 12,576,697 B1
(45) Date of Patent: Mar. 17, 2026

(54) REINFORCEMENT ELEMENT FOR SUN SHADES, BUCKLE RESISTANT SUN SHADES, SUN SHADES FOR VEHICLES, AND METHOD OF MAKING SAME

(71) Applicant: Xiao Shi, Laurel, MD (US)

(72) Inventor: Xiao Shi, Laurel, MD (US)

( * ) Notice: Subject to any disclaimer, the term of this patent is extended or adjusted under 35 U.S.C. 154(b) by 0 days.

(21) Appl. No.: 19/060,185

(22) Filed: Feb. 21, 2025

(51) Int. Cl.
 B60J 1/20 (2006.01)

(52) U.S. Cl.
 CPC .................................. B60J 1/2091 (2013.01)

(58) Field of Classification Search
 CPC ...... B60J 1/2091; B60J 1/2011; B60J 1/2041; B60J 11/00; B60J 11/08; E06B 2009/135
 See application file for complete search history.

(56) References Cited

U.S. PATENT DOCUMENTS

| | | | | | |
|---|---|---|---|---|---|
| 4,020,207 | A | * | 4/1977 | Alfter | B60R 13/0225 428/116 |
| 4,262,955 | A | * | 4/1981 | Duda | B60R 5/045 296/37.16 |
| 4,958,880 | A | * | 9/1990 | Champane | B60J 1/2091 296/97.7 |
| 5,267,599 | A | * | 12/1993 | Kim | B60J 1/2091 160/DIG. 3 |
| 5,324,090 | A | * | 6/1994 | Lehnhoff | B60J 11/08 160/370.21 |
| 5,620,040 | A | * | 4/1997 | Swanner | B60J 7/10 160/264 |
| 5,845,697 | A | * | 12/1998 | Zheng | E04H 15/40 160/370.21 |
| 9,643,476 | B2 | * | 5/2017 | Lenterman | B60J 1/2091 |
| 2005/0000664 | A1 | * | 1/2005 | Huang | B60J 1/2091 160/370.21 |
| 2009/0008045 | A1 | * | 1/2009 | Serneels | B60J 7/0015 296/1.07 |
| 2013/0032299 | A1 | * | 2/2013 | Bratcher | F02D 45/00 160/84.01 |

* cited by examiner

*Primary Examiner* — Abe Massad
(74) *Attorney, Agent, or Firm* — THE GARCIA-ZAMOR LAW FIRM; Ruy Garcia-Zamor

(57) ABSTRACT

A sunshade for vehicles that is durable for use with extra-large windows. The sunshade is foldable and unfoldable between a first, extended, in use configuration and a second, compact, storage configuration. The sunshade is buckling resistance so as to reduce the instances in which buckling occurs during use while positioned proximate an inner surface of the vehicle window.

20 Claims, 13 Drawing Sheets

REINFORCEMENT ELEMENT FOR SUN SHADES, BUCKLE RESISTANT SUN SHADES, SUN SHADES FOR VEHICLES, AND METHOD OF MAKING SAME

BACKGROUND

The present invention is generally directed to vehicle accessories and, more specifically, to sunshades for vehicles. More specifically still, the invention is directed toward buckle resistant sunshades for vehicles.

Typical sunshades tend to blow or bend away from the inner surface of vehicle windows during use. This can be caused due to humidity, temperature, and/or due to the large size of the vehicle window. This reduces the service life and durability of sunshades.

Therefore, it may be advantageous to provide having at least one of the following features: being movable from a first in use position to a second compact position while folding the sunshade along both vertical and horizontal axes; being aesthetically pleasing; having an components which resist buckling; and/or having improved durability.

SUMMARY

Briefly speaking, One preferred embodiment of the present invention is directed to a sunshade for a vehicle. The sunshade may include a shade body which defines a perimeter and has first and second major surfaces. The shade body may be configured for detachable positioning inside a window of the vehicle such that, when installed, the shade body defines an upper edge, a lower edge, a vertical direction, and a horizontal direction. The shade body may define a plurality of sub panels. It is preferred that each of the plurality of sub panels is connected to another of the sub panels by a fold section that forms a flexible joint such that the shade body includes a plurality of flexible joints. The shade body may be foldable and unfoldable between a first, extended, in use configuration and a second, compact, storage configuration/ position. The shade body may further comprise a pocket extending in in the vertical direction and located adjacent to one of the plurality of flexible joints. The pocket may define a channel therein. A reinforcement member may be located in the channel of the pocket to provide stiffness to the sunshade such that when the sunshade is in the first, extended, in use, configuration and installed generally adjacent to an inner surface of the window of the vehicle the sunshade is resistant to buckling inwardly away from the inner surface of window.

In another aspect, the present invention is directed to a sunshade for a vehicle. The sunshade may include a shade body which defines a perimeter and has first and second major surfaces. The shade body may be configured for detachable positioning inside a window of the vehicle such that, when installed, the shade body defines an upper edge, a lower edge, a vertical direction, and a horizontal direction. The shade body may define a plurality of sub panels. It is preferred that each of the plurality of sub panels is connected to another of the sub panels by a fold section that forms a flexible joint such that the shade body includes a plurality of flexible joints. Each flexible joint may be formed on a first lateral side by a sewn seam and on an opposing lateral side by at least one linear indentation that extends vertically in the shade body.

In another aspect, the present invention is directed to a sunshade for a vehicle. The sunshade may include a shade body which defines a perimeter and has first and second major surfaces. The shade body may be configured for detachable positioning inside a window of the vehicle such that, when installed, the shade body defines an upper edge, a lower edge, a vertical direction, and a horizontal direction. The shade body may define a plurality of sub panels. It is preferred that each of the plurality of sub panels is connected to another of the sub panels by a fold section that forms a flexible joint such that the shade body includes a plurality of flexible joints. The shade body may be foldable and unfoldable between a first, extended, in use configuration and a second, compact, storage configuration/position. A reinforcement member may be located any one of thereon and therein to provide stiffness to the sunshade such that when the sunshade is in the first, extended, in use, configuration and installed generally adjacent to an inner surface of the window of the vehicle the sunshade is resistant to buckling inwardly away from the inner surface of window. Wherein when viewing the first major surface while the sunshade is in the first, extended, in-use configuration the reinforcement member is oriented to be concave to the viewer.

In another preferred aspect, the present invention is directed to a sunshade for a vehicle. The sunshade may include a shade body which defines a perimeter and has first and second major surfaces. The shade body may define a plurality of sub panels. It is preferred that each of the plurality of sub panels is connected to another of the sub panels by a fold section that forms a flexible joint such that the shade body includes a plurality of flexible joints. The shade body may be foldable and unfoldable between a first, extended, in use configuration and a second, compact, storage configuration. A reinforcement member may be located any one of thereon and therein to provide stiffness to the sunshade such that when the sunshade is in the first, extended, in use, configuration and installed generally adjacent to an inner surface of the window of the vehicle the sunshade is resistant to buckling inwardly away from the inner surface of window. Wherein the reinforcement member has a horizontal cross section that is arcuate.

In another preferred aspect, the present invention is directed to a sunshade for a vehicle. The sunshade may include a shade body which defines a perimeter and has first and second major surfaces. The shade body may define a plurality of sub panels. It is preferred that each of the plurality of sub panels is connected to another of the sub panels by a fold section that forms a flexible joint such that the shade body includes a plurality of flexible joints. The shade body may be foldable and unfoldable between a first, extended, in use configuration and a second, compact, storage configuration. A reinforcement member may be located any one of thereon and therein to provide stiffness to the sunshade such that when the sunshade is in the first, extended, in use, configuration and installed generally adjacent to an inner surface of the window of the vehicle the sunshade is resistant to buckling inwardly away from the inner surface of window. Wherein the reinforcement member has a horizontal cross section that is arcuate. The reinforcement member is an elongated metallic, alloy, plastic, composite member, or polymeric member having opposing axial ends and extending over a majority of a height of the shade body, the reinforcement member is foldable such that the reinforcement member can be folded toward itself by bending about a horizontal axis of the shade body to bring the opposing axial ends closer together.

In another preferred aspect, the present invention is directed to a sunshade for a vehicle. The shade body may be foldable and unfoldable about vertically extending fold lines between a first, extended, in use configuration and a second, compact, storage configuration. A reinforcement member may be located any one of thereon and therein to provide stiffness to the sunshade such that when the sunshade is in the first, extended, in use, configuration and installed generally adjacent to an inner surface of the window of the vehicle the sunshade is resistant to buckling inwardly away from the inner surface of window. Wherein the reinforcement member has a horizontal cross section that is arcuate. The reinforcement member is an elongated metallic, alloy, plastic, composite member, or polymeric member having opposing axial ends and extending over a majority of a height of the shade body, the reinforcement member is foldable such that the reinforcement member can be folded toward itself by bending about horizontally extending fold lines to bring the opposing axial ends closer together.

In another preferred aspect, the present invention is directed to a sunshade for a vehicle. The sunshade may include a shade body which defines a perimeter and has first and second major surfaces. The shade body may be configured for detachable positioning inside a window of the vehicle such that, when installed, the shade body defines an upper edge, a lower edge, a vertical direction, and a horizontal direction. The shade body may define a plurality of sub panels. It is preferred that each of the plurality of sub panels is connected to another of the sub panels by a fold section that forms a flexible joint such that the shade body includes a plurality of flexible joints. The shade body may be foldable and unfoldable between a first, extended, in use configuration and a second, compact, storage position. A reinforcement member may be located any one of thereon and therein to provide stiffness to the sunshade such that when the sunshade is in the first, extended, in use, configuration and installed generally adjacent to an inner surface of the window of the vehicle the sunshade is resistant to buckling inwardly away from the inner surface of window. Wherein when viewing the first major surface while the sunshade is in the first, extended, in-use configuration the reinforcement member is oriented to be concave and has a generally W-shaped or corrugated shaped horizontal cross-section.

In another preferred aspect, the present invention is directed to a sunshade for a vehicle. The shade body preferably includes a plurality of flexible joints. The shade body may be foldable and unfoldable between a first, extended, in use configuration and a second, compact, storage configuration. A reinforcement member may be located any one of thereon and therein to provide stiffness to the sunshade such that when the sunshade is in the first, extended, in use, configuration and installed generally adjacent to an inner surface of the window of the vehicle the sunshade is resistant to buckling inwardly away from the inner surface of window. Wherein when viewing the first major surface while the sunshade is in the first, extended, in-use configuration the reinforcement member is oriented to be concave and has a generally W-shaped or corrugated shaped horizontal cross-section.

In another preferred aspect, the present invention is directed to a sunshade for a vehicle. The shade body preferably includes a reinforcement member that may be located any one of thereon and therein to provide stiffness to the sunshade such that when the sunshade is in the first, extended, in use, configuration and installed generally adjacent to an inner surface of the window of the vehicle the sunshade is resistant to buckling inwardly away from the inner surface of window. Wherein the reinforcement member has a generally W-shaped or corrugated shaped horizontal cross-section.

In another preferred aspect, the present invention is directed to a sunshade for a vehicle. The sunshade may include a shade body which defines a perimeter and has first and second major surfaces. The shade body may be configured for detachable positioning inside a window of the vehicle such that, when installed, the shade body defines an upper edge, a lower edge, a vertical direction, and a horizontal direction. The shade body may define a plurality of sub panels. It is preferred that each of the plurality of sub panels is connected to another of the sub panels by a fold section that forms a flexible joint such that the shade body includes a plurality of flexible joints. The shade body may be foldable and unfoldable between a first, extended, in use configuration and a second, compact, storage configuration. A reinforcement member may be located thereon to provide stiffness to the sunshade such that when the sunshade is in the first, extended, in use, configuration and installed generally adjacent to an inner surface of the window of the vehicle the sunshade is resistant to buckling inwardly away from the inner surface of window. The reinforcement member being attached to the shade body via adhesive.

In another preferred aspect, the present invention is directed to a sunshade for a vehicle. The sunshade may include a shade body. The shade body may be foldable and unfoldable between a first, extended, in use configuration and a second, compact, storage configuration. A reinforcement member may be located thereon to provide stiffness to the sunshade such that when the sunshade is in the first, extended, in use, configuration and installed generally adjacent to an inner surface of the window of the vehicle the sunshade is resistant to buckling inwardly away from the inner surface of window. The reinforcement member being attached to the shade body via adhesive.

In another preferred aspect, the present invention is directed to a sunshade for a vehicle. The sunshade may include a shade body. A reinforcement member may be located thereon to provide stiffness to the sunshade such that when the sunshade is installed generally adjacent to an inner surface of the window of the vehicle the sunshade is resistant to buckling inwardly away from the inner surface of the window of the vehicle the sunshade is resistant to buckling inwardly away from the inner surface of window. The reinforcement member being attached to the shade body via adhesive.

In another preferred aspect, the present invention is directed to a sunshade for a vehicle. The sunshade may include a shade body which defines a perimeter. The shade body may be foldable and unfoldable between a first, extended, in use configuration and a second, compact, storage position. A reinforcement member may be located thereon to provide stiffness to the sunshade such that when the sunshade is in the first, extended, in use, configuration and installed generally adjacent to an inner surface of the window of the vehicle the sunshade is resistant to buckling inwardly away from the inner surface of window.

In another preferred aspect, the present invention is directed to a sunshade for a vehicle. The sunshade may include a shade body which defines a perimeter. A reinforcement member may be located thereon to provide stiffness to the sunshade such that when the sunshade is in the first, extended, in use, configuration and installed generally adjacent to an inner surface of the window of the vehicle the sunshade is resistant to buckling inwardly away from the inner surface of window.

BRIEF DESCRIPTION OF THE DRAWINGS

The foregoing summary, as well as the following detailed description of the preferred embodiments of the present invention will be better understood when read in conjunction with the appended drawings. For the purpose of illustrating the invention, there are shown in the drawings embodiments which are presently preferred. At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. It is understood, however, that the invention is not limited to the precise arrangements and instrumentalities shown. In the drawings.

DETAILED DESCRIPTION OF THE PREFERRED EMBODIMENT

Figure 1:
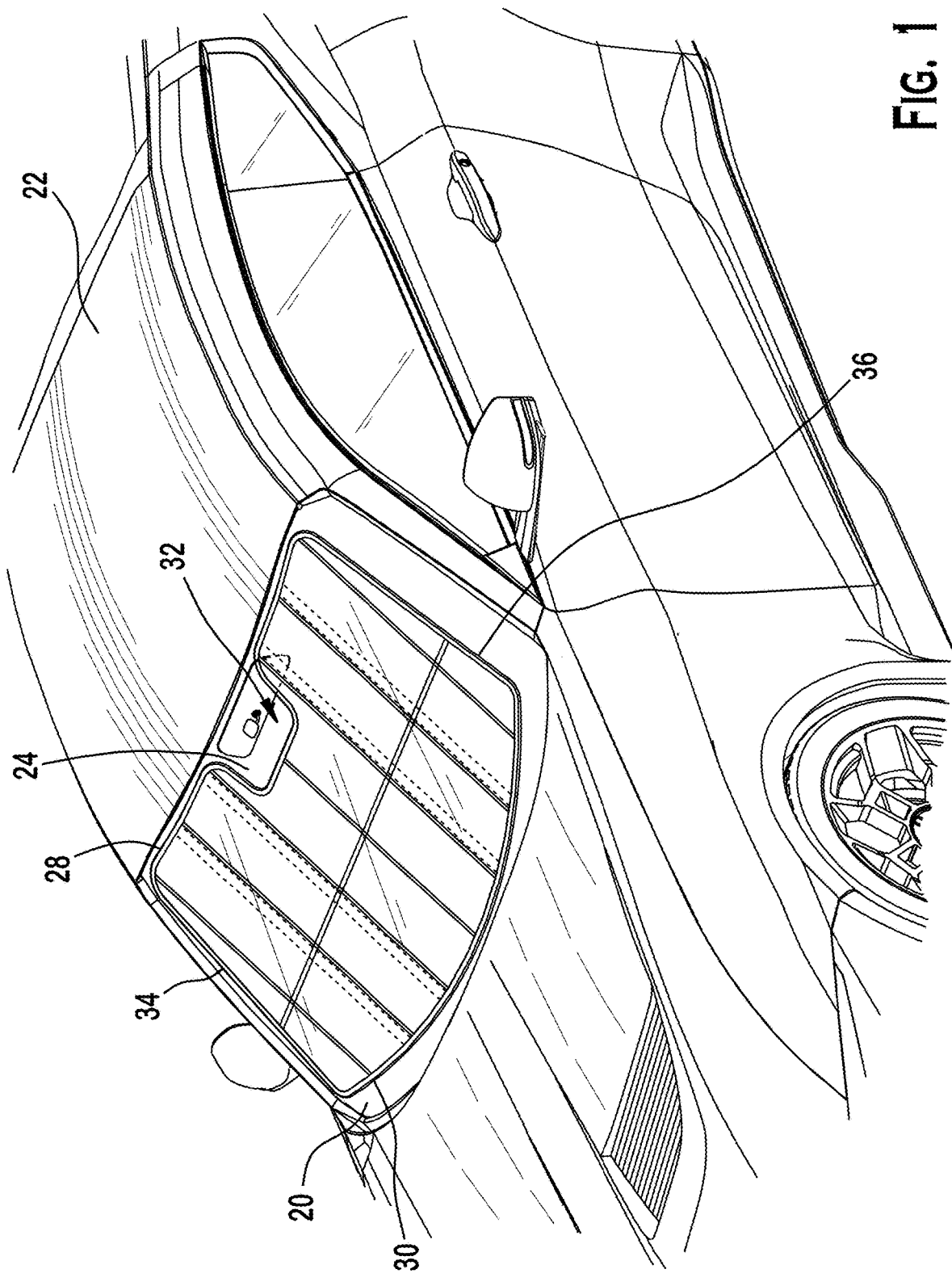
FIG. 1 is a front perspective view of a preferred embodiment of a sunshade 20 according to the present invention positioned inside a window 24 of a car 22. The sunshade 20 is shown configured in a first, extended, in use configuration.

Certain terminology is used in the following description for convenience only and is not limiting. The words "right," "left," "up," "upper," "lower," "into the paper" and "down" designate the directions as they would be understood by a person facing in the viewing direction unless specified otherwise. At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The words "outer" and "inner" refer to directions away from and toward, respectively, the geometric center of the specified element, or, if no part is specified, the geometric center of the shade 20. Those of ordinary skill in the art will appreciate from this disclosure that skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. The language "at least one of 'A', 'B', and 'C'," as used in the claims and in corresponding portions of the specification, means "any group having at least one 'A'; or any group having at least one 'B'; or any group having at least one 'C'; —and does require that a group have at least one of each of 'A', 'B', and 'C'." More specifically, the language 'at least two/three of the following list' (the list itemizing items '1', '2', '3', '4', etc.), as used in the claims, means at least two/three total items selected from the list and does not mean two/three of each item in the list. The term "in-use position," as used in the claims and corresponding portions of the specification, means "a configuration of the shade in which it is suitable for blocking some light." The term "vehicle" as used in the specification and claims is defined as meaning "any one of a car, vehicle, automobile, boat, plane, structure having a window, or the like." Additionally, the words "a" and "one" are defined as including one or more of the referenced items unless specifically stated otherwise. The terminology includes the words specifically mentioned above, derivatives thereof, and words of similar import.

Referring generally to FIGS. 1-19, wherein like numerals indicate like elements throughout, a shade 20 is disclosed in its preferred embodiment. The shade 20 is preferably used with an automobile 22 or truck. However, those of ordinary skill in the art will appreciate from this disclosure that the shade 20 can be used with a boat, a plane, or with any structure that has a window therein without departing from the scope of the present invention.

Referring to FIG. 1, the shade 20 is shown inside an automobile 22 window 24 with the shade 20 configured in a first, extended, in use, configuration. While the shade 20 is shown having a particular perimeter and shape, those of ordinary skill in the art will appreciate from this invention that the shape and perimeter of the shade 20 can vary without departing from the scope of the present invention. As such, when the shade 20 is in the in use configuration, the perimeter 26 can form a square, a rectangle, a circle, an irregular shape, or the like without departing from the scope of the present invention.

Figure 2:
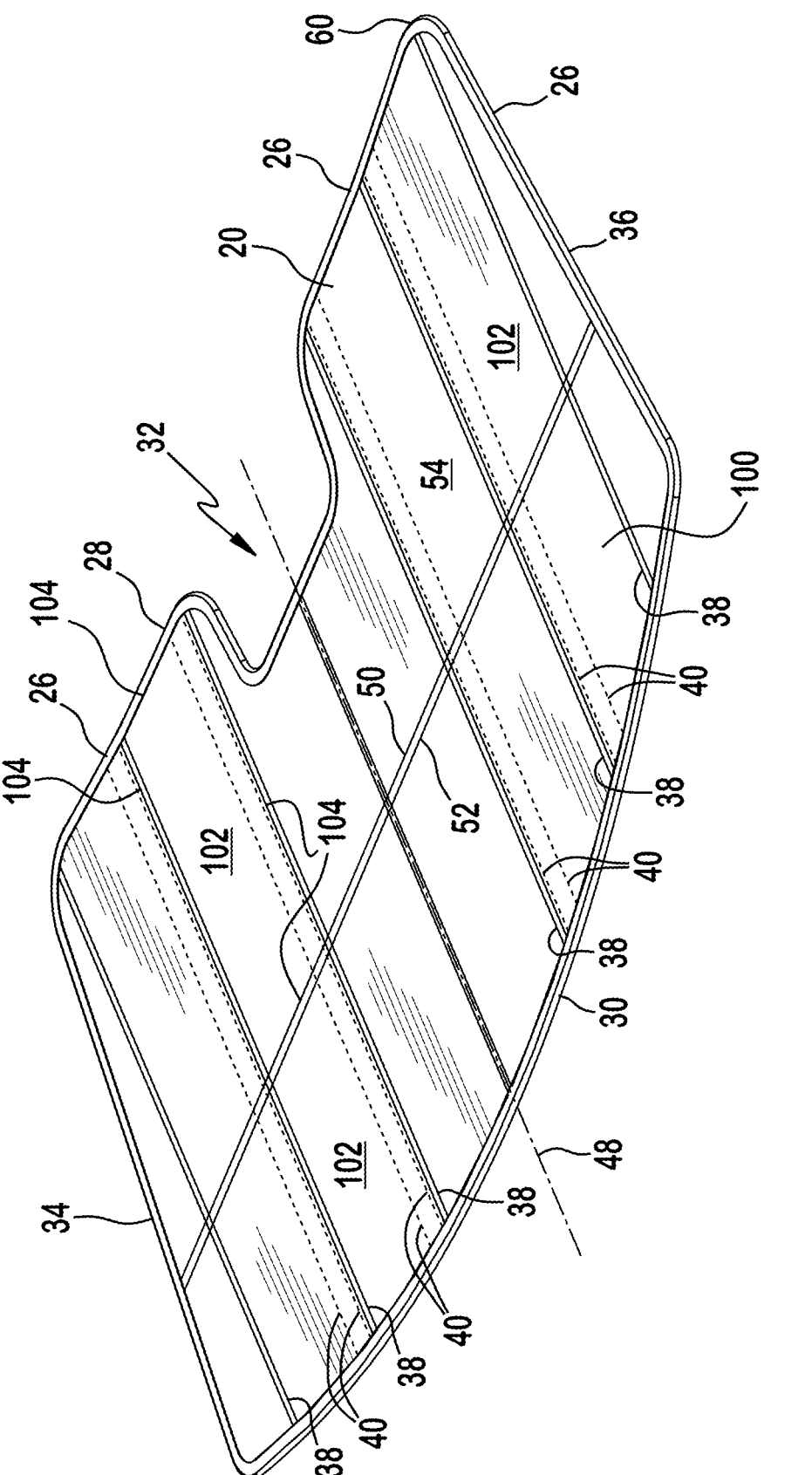
FIG. 2 is a top, right, perspective view of the sunshade 20 of FIG. 1. Fabric edging 60 preferably extends about the perimeter 26 of the sunshade 20. The sunshade 20 preferably includes vertically extending fold sections 38. The vertical direction and axis can be defined by centerline 48. The horizontal direction and a horizontal axis can be defined by a fold section which is bordered by linear indentations 50, 52. Thus, the sunshade may be capable of folding in half about the horizontal axis and being folded vertically about multiple vertical fold sections 38 to position in a second, compact, storage configuration.

Referring to FIGS. 1 and 2, the shade 20 preferably has a first major surface 54. The shade 24 of vehicle 22 preferably includes shade body 100. The shade body 100 defines a perimeter 26 and has first and second major surfaces 54, 56. The shade body 100 is preferably configured for detachable positioning inside a window 24 of a vehicle 22 such that, when installed, the shade body 100 defines an upper edge 28, a lower edge 30, a vertical direction, and a horizontal direction. The vertical direction preferably extends parallel to the center line 48 and the horizontal direction preferably extends parallel to linear indentations 50, 52. The vertical direction and axis can be defined by centerline 48. The horizontal direction and a horizontal axis can be defined by a fold section which is bordered by linear indentations 50, 52. Thus, the sunshade may be capable of folding in half about the horizontal axis and being folded vertically about multiple vertical fold sections 38 to position in a second, compact, storage configuration.

The upper edge 28 of the shade body 100 preferably, but not necessarily, includes a generally centrally located notch portion 32. The shade body also preferably includes first lateral edge 34 and second lateral edge 36.

One preferred embodiment of the shade 20 has a perimeter 26, as follows. An upper edge of the first lateral edge 34 extends through a rounded corner to form a left side of the upper edge 28 of the perimeter 26. Moving in the same direction along the perimeter (and away from the rounded corner), the upper edge 28 extends generally linearly until a second rounded corner is reached which forms the beginning of the notch portion 32. It is preferred that the second rounded corner is reached prior to reaching the centerline 48 of the shade 20. The second rounded corner ends in a generally linear segment 32C that extends downwardly toward the lower edge 30, then extends through an approximately 90° curve been to form a second linear segment 32A that extends across the centerline 48 and then goes through an upwardly curved bend to form a third linear segment 32B. The three linear segments 32A, 32B, 32C preferably form the notch 32. Continuing around the perimeter of the shade body in the same direction set forth above, the upper right end of the notch 32 goes through a rightward bend to form a second linear upper edge 28 portion 28 of the perimeter 26. Continuing to move along the perimeter 26 in the same direction, the upper edge portion 28 of the perimeter 26 goes through a bend and forms the second lateral edge 36 to head generally downwardly. Afterwards, a lower portion of the second lateral edge 36 goes through a bend to form an arcuate lower edge 30 of the perimeter 26. It is preferable that the first and second lateral edges 34, 36 are askew from each other.

Figure 3:
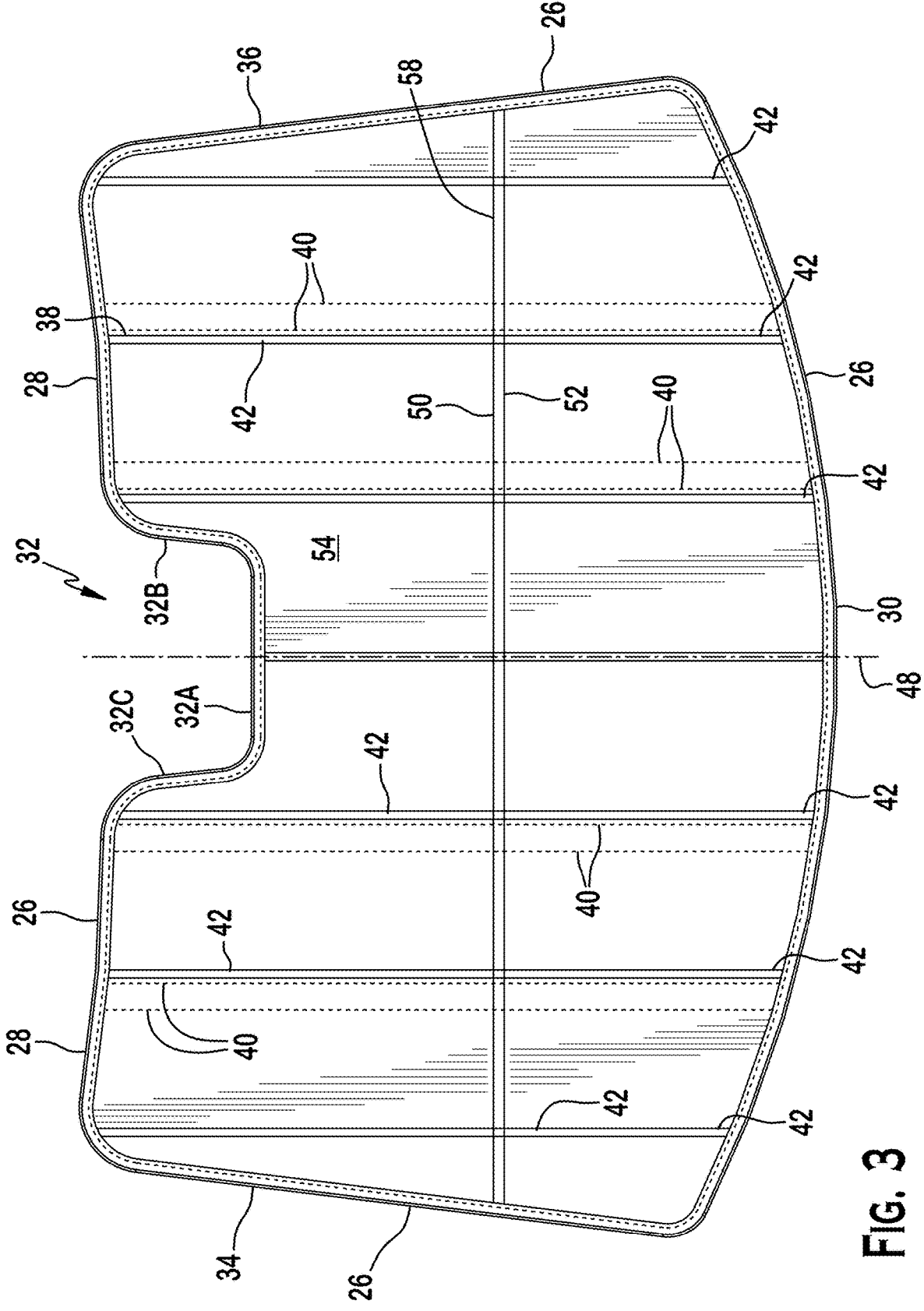
FIG. 3 is a top plan view of the sunshade 20. Seams 40 preferably form opposing edges of pockets 46 (not shown) which are located on the opposing surface to the one seen in the figure. Alternatively the pockets can be formed by sonic welding, adhesive, fasteners, hook and loop material, or the like without departing from the scope of the present invention. This figure illustrates the first major surface 54 which is preferably reflective.
Figure 4:
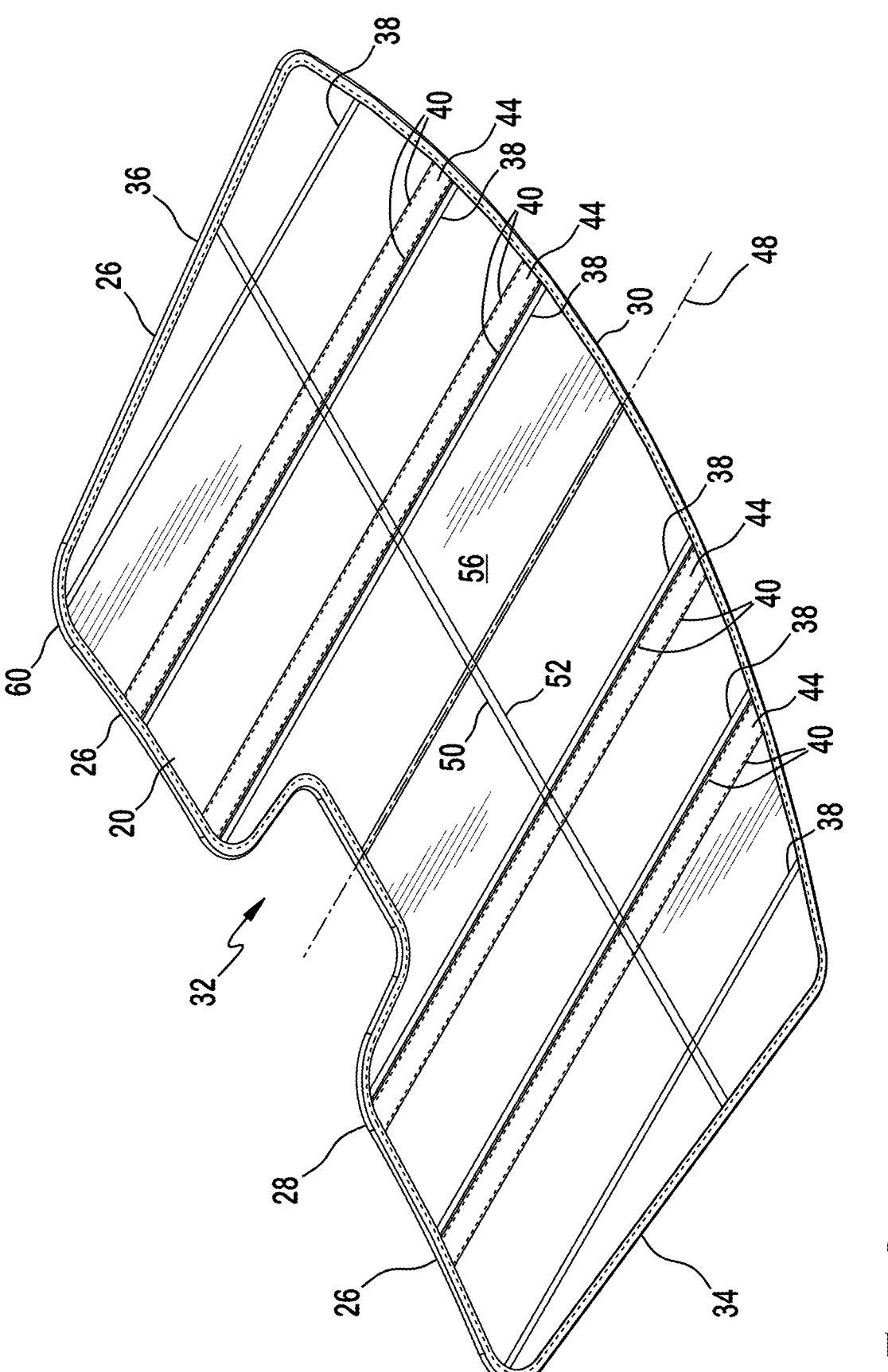
FIG. 4 is a bottom, left perspective view of the sunshade 20 of FIG. 1. This figure illustrates the second major surface 56 of the sunshade 20. Pockets 44 can be seen positioned thereon. The pockets 44 may be formed of elastomeric material, fabric, polymer or any other suitable material. When the shade body 100 is folded about the horizontal axis, it is preferable that the top of the shade is folded into the paper around the horizontal axis such that the upper edge 26 and the lower edge 30 are brought closer together. It is preferred but not necessary that the pockets extend around the outside of the horizontal fold in the shade body 100.
Figure 5:
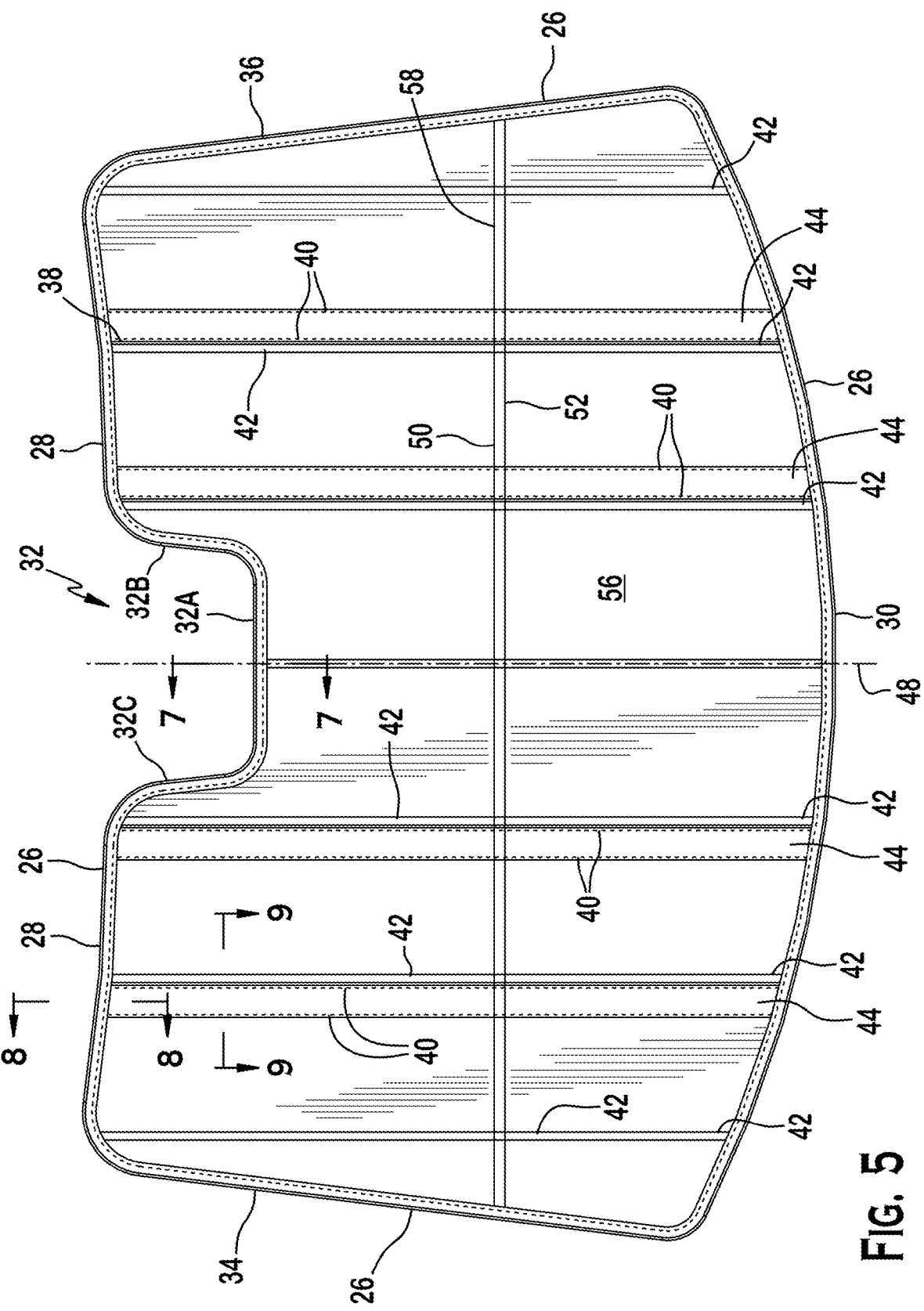
FIG. 5 is a bottom plan view of the sunshade 20 of FIG. 1 also illustrating the second major surface 56 thereof.

Referring to FIGS. 3-5, it is preferable that the first major surface 54 is reflective. When the shade 20 is in the first, extended, in-use configuration with the shade 20 adjacent to the inner surface of the window 24 with the first major surface 54 facing the inner surface of the window 24, the reflectiveness preferably allows some solar radiation to be directed out of the vehicle 22 to assist with keeping an interior of the vehicle 22 cooler than if the first major surface 54 were not reflective. Those of ordinary skill in the art will appreciate from this disclosure that many types of material can be used to form a reflective surface without departing from the scope of the present invention. Any material that allows for a partial reflection to be viewed thereon, or a metallic shiny silver, glass bead material, reflective fabric, reflective aluminum, reflective vinyl, white color, or the like may serve as the reflective surface.

Referring to FIG. 2, the shade body 100 preferably, but not necessarily, defines a plurality of subpanels 102. The plurality of subpanels 102 may be generally rectilinear. However, those of ordinary skill in the art will appreciate that perimeter sides 104 of the subpanels 102 may be arcuate or irregular without departing from the scope of the present invention. While multiple stacked subpanels 102 are shown that are separated by horizontal, generally linear indentations 50, 52, those of ordinary skill in the art will appreciate from this disclosure that the subpanels 102 can extend across an entire height of the shade 20 or across an entire width of the shade 20 without departing from the scope of the present invention.

Figures 9, 10:
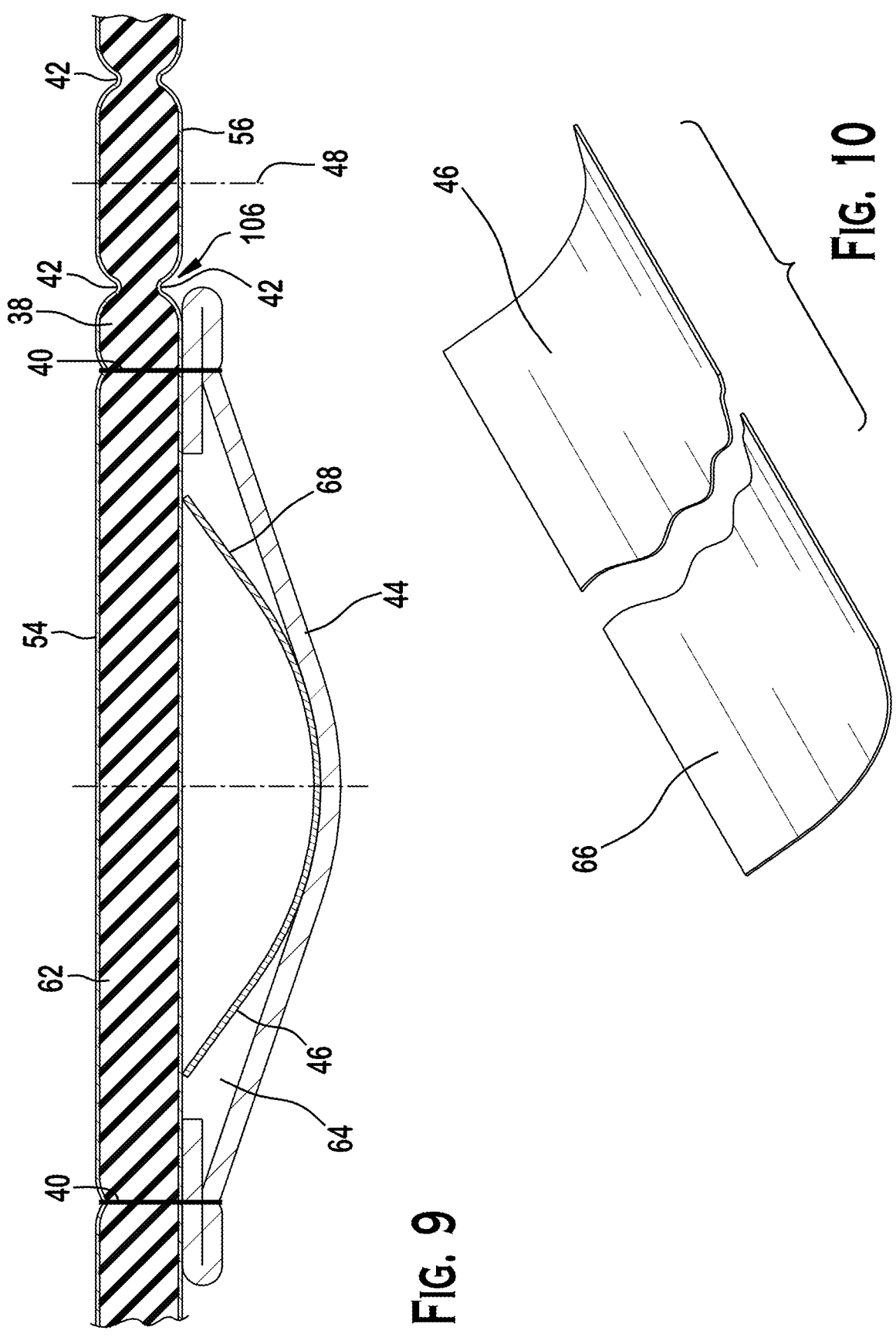
FIG. 9 is a cross-sectional view of the sunshade of FIG. 5 as taken along the cross-sectional lines 9-9 in FIG. 5 and illustrates a pocket 44 which forms a chamber 64 therein in which is positioned a reinforcement member 46 having an arcuate shape.
FIG. 10 is a perspective view of the reinforcement member 46 of FIG. 9.

Referring to FIGS. 5 and 9, the shade 20 preferably includes a plurality of seams 40 therein. At least some of the plurality of seams 20 form a portion of a subpanel perimeter 104 by pulling the first and second major surfaces 54, 56 closer together therealong. Those of ordinary skill in the art will appreciate from this disclosure that the seams 40 can be replaced by heat welding, sonic welding, adhesive, shaping of the shade body 100 itself, or the like without departing from the scope of the present invention.

Figure 11:
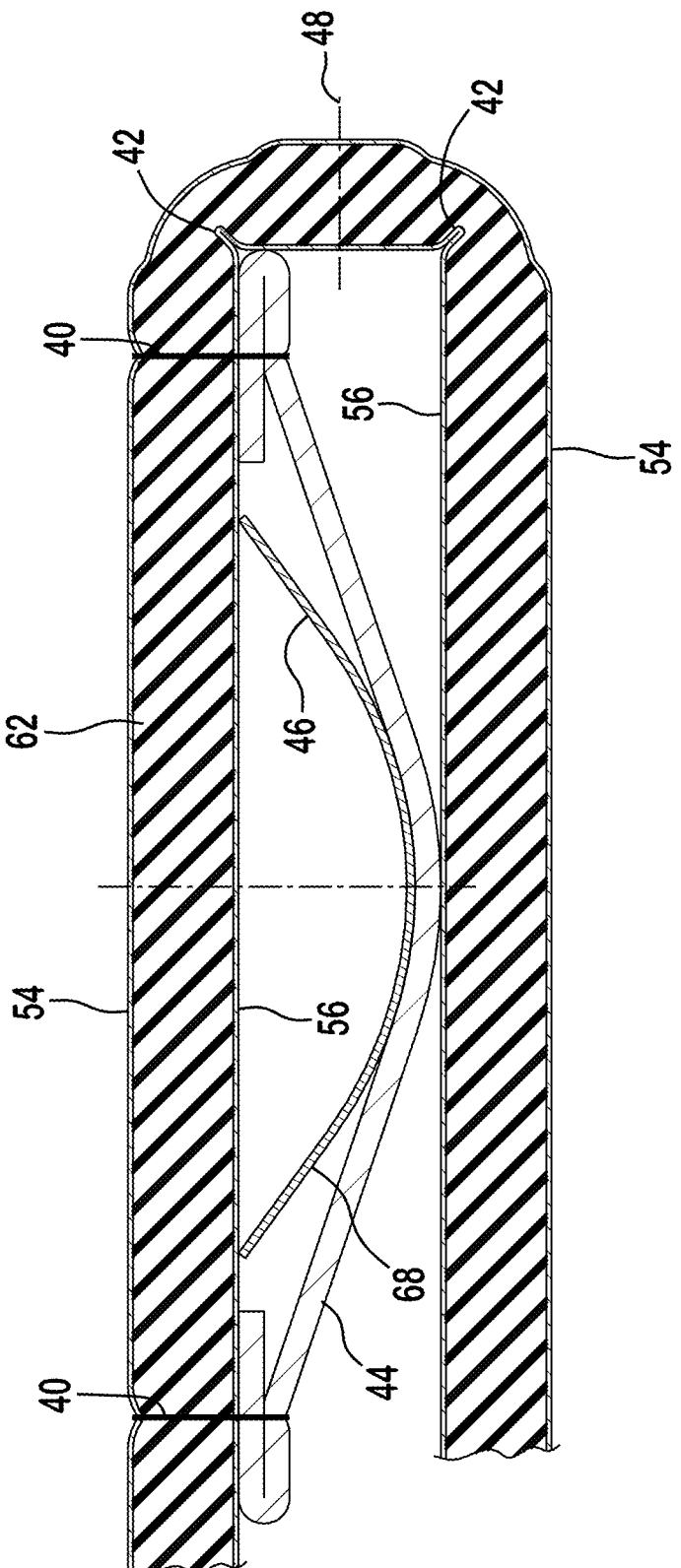
FIG. 11 is a cross-sectional view of the sunshade 20 proximate to the centerline 48 when at least partially folded into the compact configuration.

Referring to FIGS. 9 and 11, each of the plurality of subpanels 102 is preferably connected to another of the subpanels 102 by a fold section 38 which forms a flexible joint such that the shade body 20 includes a plurality of flexible joints 38. It is preferred, but not necessarily, that the flexible joint 38 is formed by one of the plurality of seams 40.

Figure 6:
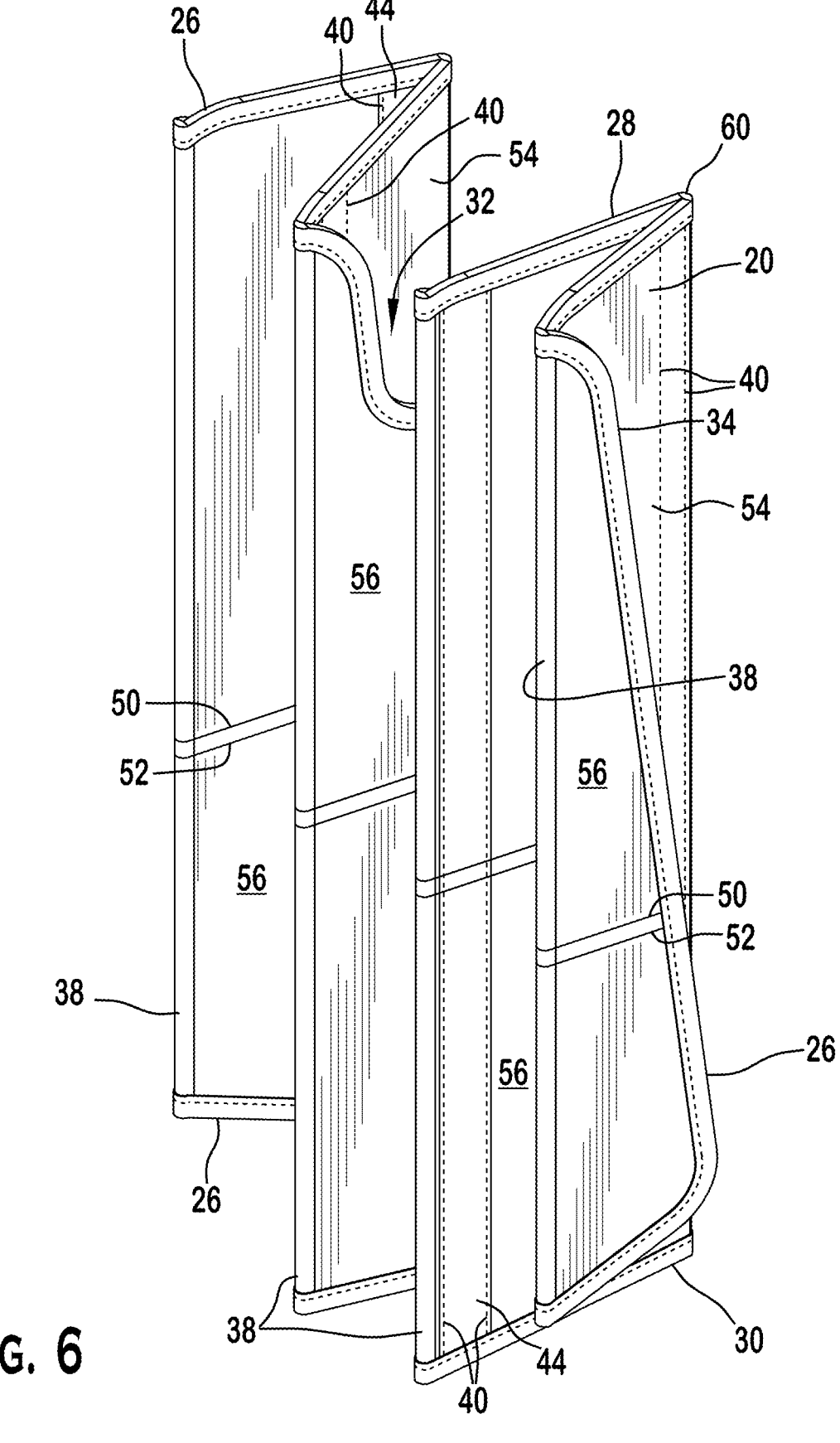
FIG. 6 is a bottom perspective view of the sunshade 20 of FIG. 1 illustrating the sunshade in a second, compact, storage position/configuration. The second, compact, storage configuration can be even more compact if the shade body 100 is also folded about the horizontal axis before folding the shade body along the vertical folds. The front of the shade body 20 shows the second major surface 56. The back of the shade body, which can be partially seen in this view, is the first major surface 54.

Referring to FIGS. 1 and 6, it is preferred that the shade body 100 is foldable and un-foldable between a first, extended, in use configuration (shown in FIG. 1) and a second, compact, storage configuration/position (shown in FIG. 6). It is preferred that the linear indentations 50, 52 create an additional horizontal fold section which allows the shade 20 to be folded along the horizontal line formed by indents 50, 52 to reduce the height of the shade 20 by approximately half to facilitate storage. In addition to folding the shade 20 in half, the shade 20 can also be folded along the vertical fold sections 32 for further compact configuration.

While the preferred embodiments of the present invention may use horizontal and/or vertical fold sections and flexible joints, those of ordinary skill in the art will appreciate from this disclosure that the fold sections can be angled relative to an axis without departing from the scope of the present invention.

Referring to FIGS. 5 and 9, the shade body 100 preferably further comprises a pocket 44 which may be formed by fabric or any other suitable material. The pocket 44 preferably extends in the vertical direction and is located adjacent to one of the plurality of flexible joints 38. The pocket, in combination with the second major surface 56, preferably defines a channel 64 therein. Referring specifically to FIG. 9, seams 40 may be positioned on opposite sides of the fabric pocket 44 and may extend through the shade body 100 and the sides of the pocket 44.

A strip, or reinforcement member, 46 may be located in the channel 64 of the pocket 44 to provide stiffness to the shade 20 such that when the shade is in the first, extended, in use, configuration (shown in FIG. 1) and installed generally adjacent to an inner surface of the window 24 of the vehicle 22 the shade 20 is resists buckling inwardly away from the inner surface of the window 24.

It is preferable that the reinforcement member 46 is an elongated metallic member. However, those of ordinary skill in the art will appreciate from this disclosure that the reinforcement member 46 may be formed of wood, polymer, or any other suitable material without departing from the scope of the present invention. Referring to FIGS. 9, 10, 13, and 15 it is preferable that the reinforcement member 46 has a cross-section in the horizontal direction that is arcuate.

Referring to FIGS. 9 and 10, in one embodiment, the reinforcement member 46 has a concave shape when looking at the shade 20 and looking at the first major surface 54. In other words, when viewing the first major surface 54 while the sunshade is in the first, extended, in-use configuration, the reinforcement member 46 is preferably oriented to be concave to the viewer. It is preferred that the concave reinforcement strip 46 opens toward the second major surface 56 of the shade body 100 such that the curved central portion of the reinforcement member 46 contacts pocket 44. This facilitates the horizontal folding of the shade body 100 in which the shade body 100 is folded about the horizontal axis such that a top portion of the first major surface 54 is brought into a bottom portion of the first major surface 54. It is preferred, but not necessary, that the selected material for the concave shaped reinforcement member 46 has enough stiffness to facilitate the shade body 100 resisting buckling while also being deformable enough such that sides of the reinforcement member 46 that bend through the horizontal fold can deformed outwardly without the entire reinforcement member needing to lose its concave shape. The concave cross-sectional shape provides resistance to bending and buckling of the shade 20 also making it possible for the shade 20 to fold in along itself along horizontal indentations 50, 52. When the shade 20 is folded in along itself along the horizontal indentations 50, 52 the outer edges of the reinforcement member 46 are deformed outwardly to allow for the folding of the shade 20 onto itself.

Figures 12, 13:
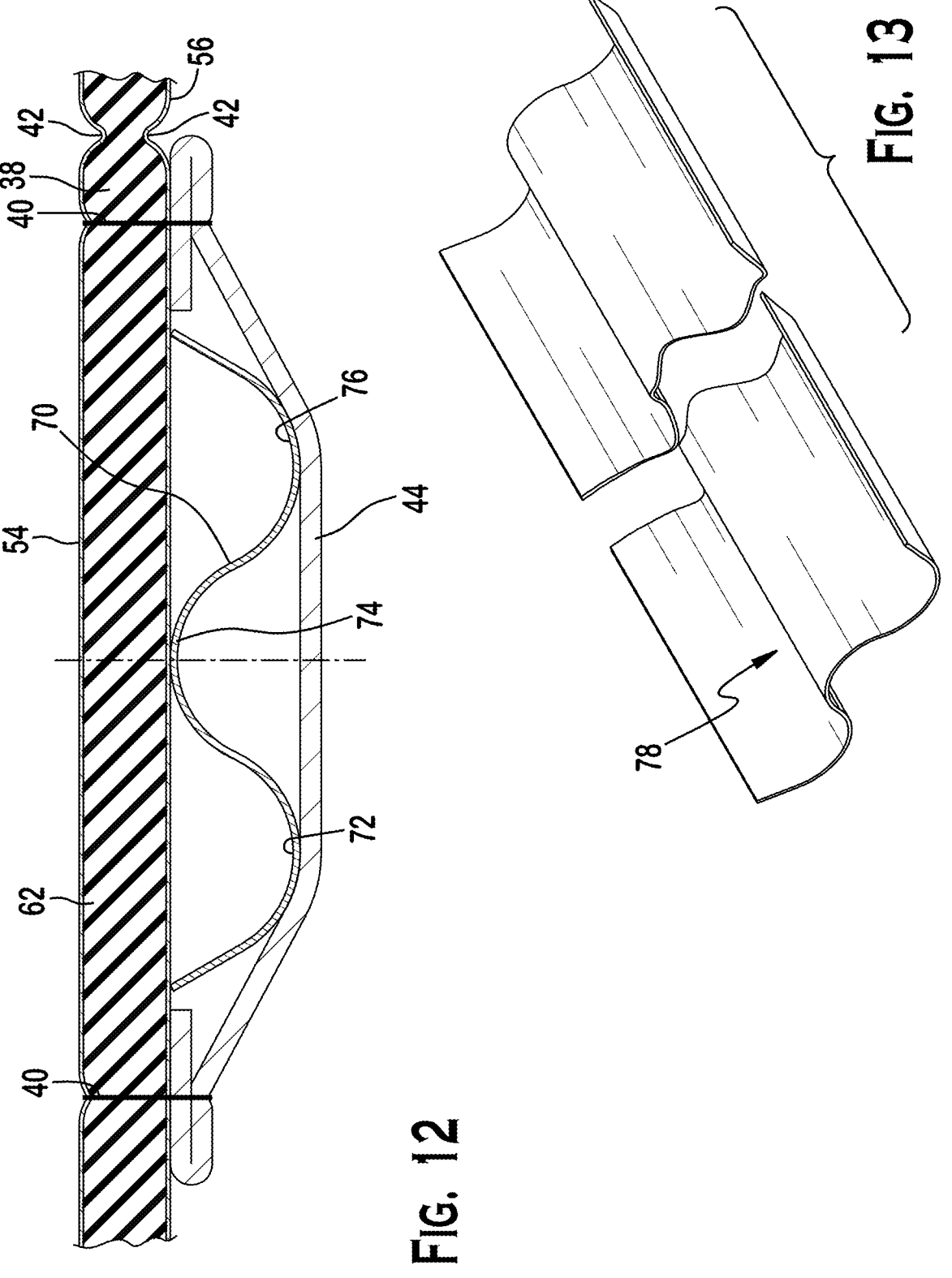
FIG. 12 is a view similar to FIG. 9 illustrating a sunshade 20 having a reinforcement member 46 with a W-shaped or corrugated horizontal cross-section 70 which forms an apex 74 and first and second valleys 72, 76. Those of ordinary skill in the art will appreciate that the reinforcement member can have a horizontal cross-section with any number of corrugations without departing from the scope of the present invention.
FIG. 13 is a perspective view of the reinforcement member 46 of FIG. 12.

Referring to FIGS. 12 and 13, in the preferred embodiment, the reinforcement member 46 preferably has a generally W-shaped horizontal cross section. Alternatively, the reinforcement member 46 may have a corrugated horizontal cross-section. Those of ordinary skill in the art will appreciate from this disclosure that the horizontal cross-section of the reinforcement member 46 may have any number of corrugations without departing from the scope of the present invention.

Referring to FIG. 12, the pocket 44 may be attached to the shade body 100 via seams 40. The seams 40 may also pull the first and second major surfaces 54, 56 of the shade body 100 closer together.

Figures 14, 15:
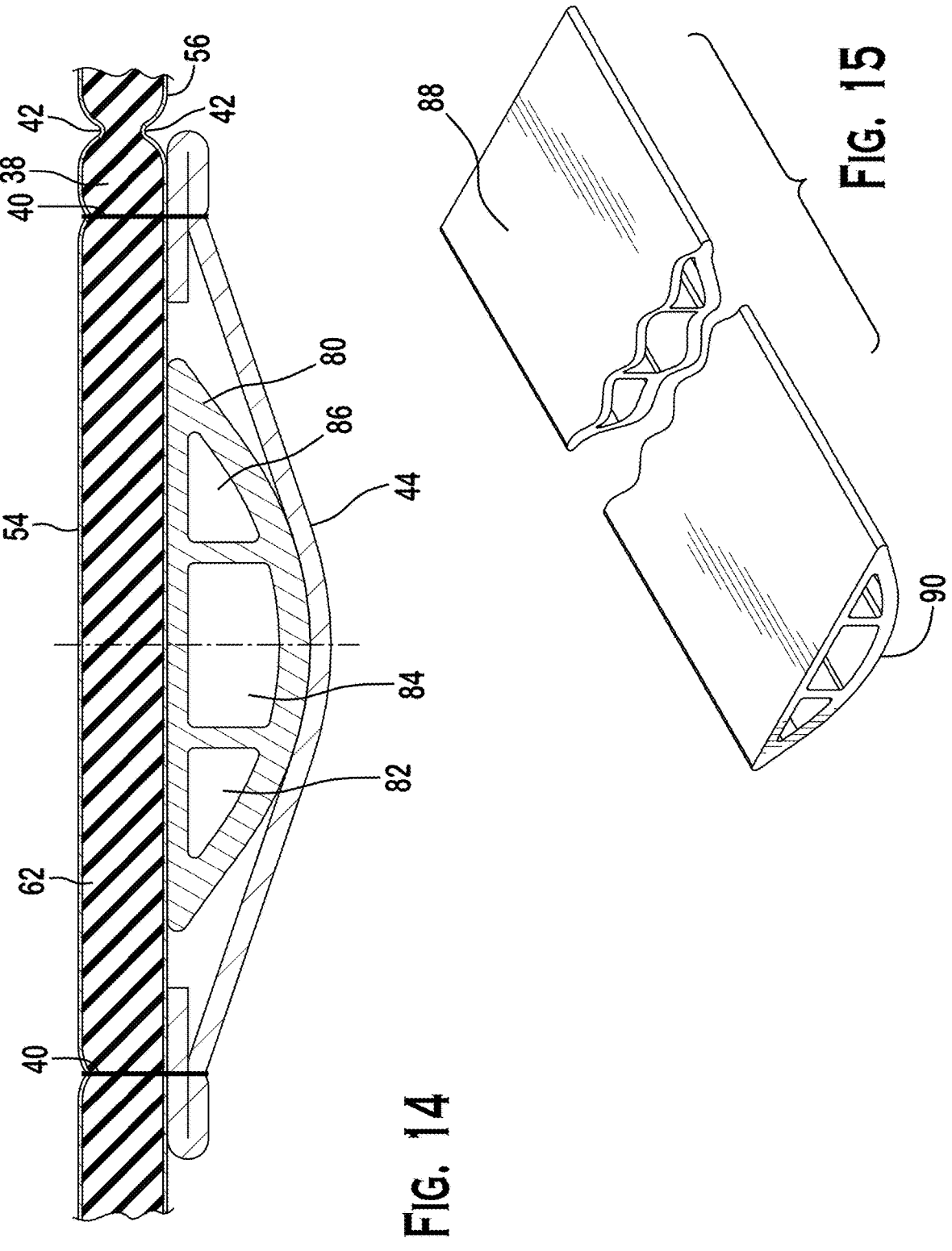
FIG. 14 is a view similar to FIG. 9 illustrating a sunshade 20 having a reinforcement member 46 with the shade supporting side 88 and a smooth arcuate dome section 90.
FIG. 15 is a perspective view of the reinforcement member 46 of FIG. 14.
Figures 18, 19:
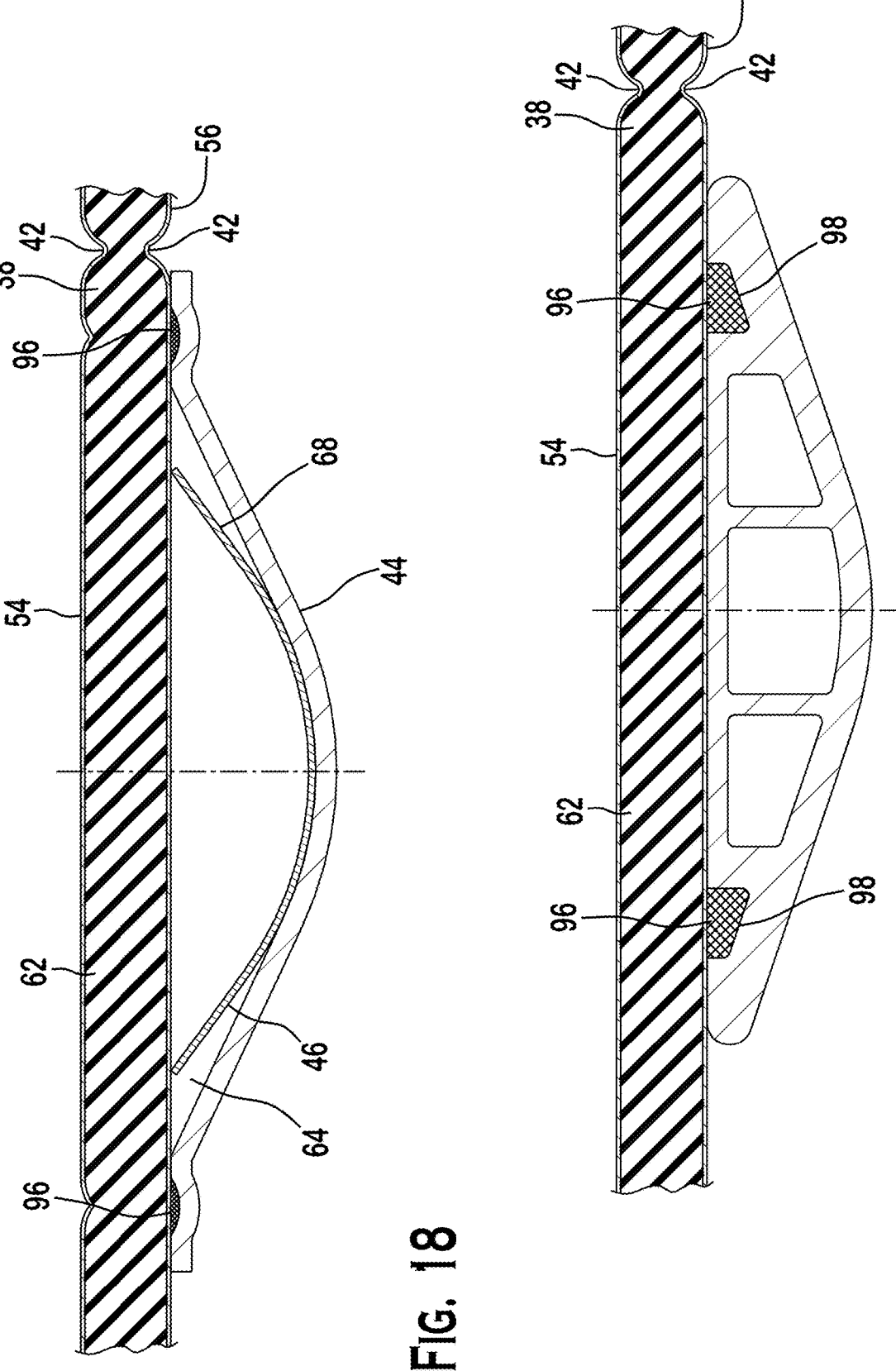
FIG. 18 is a view similar to FIG. 9 illustrating a sunshade 20 having a pocket secured via adhesive.
FIG. 19 is a view similar to FIG. 14 illustrating a sunshade 20 having a reinforcement member 46 directly attached with adhesive and without the use of a pocket.

Referring to FIGS. 14 and 15, the reinforcement strip 46 may have a generally flat shade support side 88 which is configured to abut the shade body 100 such that when viewed in horizontal cross-section, the generally flat shade support side 88 forms a perimeter of the reinforcement strip 46 and the remainder of the perimeter is formed by an arcuate shape 90. At least one elongated hollow 84, 82, 86 is preferably defined within the reinforcement strip/member 46. Referring to FIG. 19, the reinforcement member 46 may include recesses 98 in which adhesive 96 is located to allow the reinforcement member 46 to be attached to the shade body 100 without the use of a pocket.

Figures 16, 17:
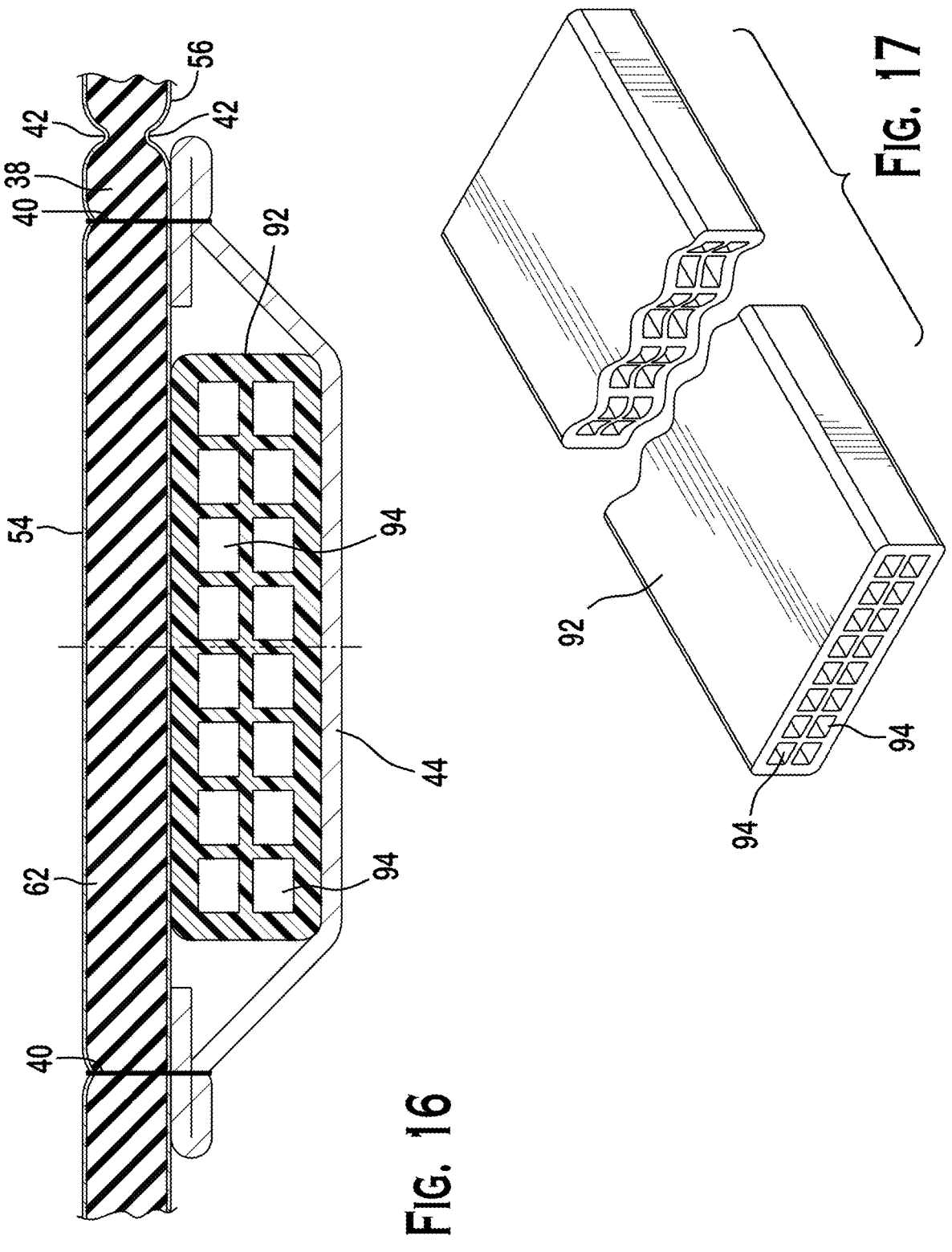
FIG. 16 is a view similar to FIG. 9 illustrating a sunshade 20 having a reinforcement member 46 with a rectilinear horizontal cross-section 92.
FIG. 17 is a perspective view of the reinforcement member 46 of FIG. 16.

Referring to FIGS. 16 and 17, in the preferred embodiment, the reinforcement strip/member 46 may have a generally rectilinear horizontal cross-section 92 with the plurality of elongated hollows 94 located therein. This embodiment of the reinforcement members 46 may also include recess and adhesive to allow the use of the reinforcement members 46 without a pocket 44 similar to the embodiment shown in FIG. 19. FIG. 18 illustrates another preferred embodiment in which edges of the pocket 44 are secured to the shade body 100 via adhesive 96. Those of ordinary skill in the art will appreciate from this disclosure that any suitable means of attaching the pocket 44 to the shade body 100 or any suitable means of attaching the reinforcement member 46 to the shade body 100 can be used without departing from the scope of the present invention.

Figures 7, 8:
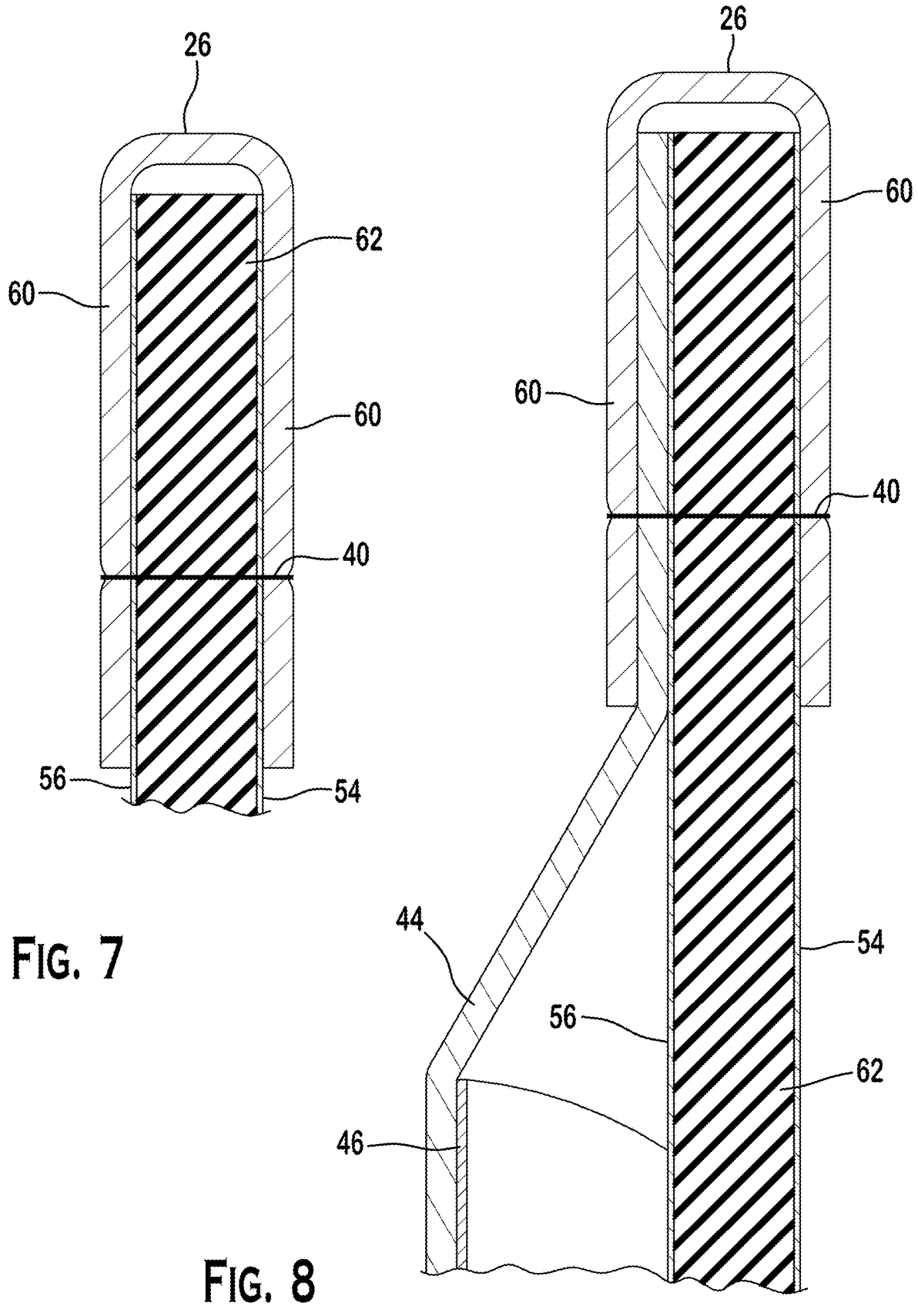
FIG. 7 is a cross-sectional view of the sunshade 20 of FIG. 5 as taken along the cross-sectional lines 7-7 in FIG. 5 and illustrates the securing of edge fabric 60 via a seam 40 along the perimeter 26 of the shade body. Alternatively, the edge fabric 60 can be secured to the shade body 100 via hook and loop material, adhesive, sonic welding, or the like without departing from the scope of the present invention.
FIG. 8 is a cross-sectional view of the sunshade of FIG. 5 as taken along the cross-sectional lines 8-8 in FIG. 5 and illustrates the securing of the fabric edging 60 along with a portion of a pocket 44 by a seam 40 proximate to a perimeter 26 of the shade body 100.

It is preferred, but not necessary that the shade 20 include a plurality of the pockets 44 each having its own reinforcement member 46 therein. The shade body 100 preferably comprises a filler material 62 and at least one outer lining. The filler material 62 may be an insulation, polymer, fiberglass, or any other suitable material. Referring to FIG. 8, fabric edging 60 can be positioned around the edges of the perimeter 26 such that a portion of the fabric edging 60 is positioned along both of the first and second major surfaces 54, 56 of the shade body 100 and secured thereto with a seam 40. Those of ordinary skill in the art will appreciate from this disclosure that fabric edging 60 can be omitted without departing from the scope of the present invention.

Referring to FIG. 9, it is preferred that the flexible joints 38 are each formed by one of the plurality of seams 40 which forms parallel edges of the elongated chamber 64 which extends in the vertical direction between the lower edge and the upper edge. The chamber preferably has the filler material 62 therein. The flexible joint 38 is also preferably formed by an inward indentation 42 in the first major surface 54 which extends linearly in the vertical direction and is spaced from the one of the plurality of the seams 40 to form opposing lateral sides of the flexible joint 38. The flexible joint 38 may include a second inward indentation 106 in the second major surface 56 which is aligned with and opposes the inward indentation 42 in the first major surface. The combination of the indentations 42, 106 and the seam 40 results in a portion of the shade body 100 located therebetween forming a flexible joint to facilitate bending of the shade body 100. Those of ordinary skill in the art will appreciate from this disclosure that the flexible joints can be formed by heat welding, sonic welding, adhesive, shaping of the shade body 100 itself, or the like without departing from the scope of the present invention.

In one embodiment, the present invention is directed to a sunshade 20 for a vehicle 22. The sunshade 20 may include a shade body 100 which defines a perimeter 26 and has first and second major surfaces 54, 56. The shade body 100 may define a plurality of sub panels 102. It is preferred that each of the plurality of sub panels 102 is connected to another of the sub panels by a fold section 38 that forms a flexible joint such that the shade body 100 includes a plurality of flexible joints. The shade body may be foldable and unfoldable between a first, extended, in use configuration and a second, compact, storage configuration. A reinforcement member 46 may be located any one of thereon and therein to provide stiffness to the sunshade such that when the sunshade is in the first, extended, in use, configuration and installed generally adjacent to an inner surface of the window of the vehicle the sunshade is resistant to buckling inwardly away from the inner surface of window. Wherein the reinforcement member has a horizontal cross section that is arcuate. The reinforcement member is an elongated metallic, alloy, plastic, composite member, or polymeric member having opposing axial ends and extending over a majority of a height of the shade body, the reinforcement member 46 is foldable about the horizontal axis such that the reinforcement member can be folded toward itself by bending about a horizontal axis of the shade body to bring the opposing axial ends closer together.

One of ordinary skill in the art would appreciate from this disclosure that the various components and elements of the present invention may be constructed of any suitably strong, wear-resistant, flexible (where desired), and inexpensive metals, polymers, alloys, plastics, and other materials without departing from the scope of the present invention. One of ordinary skill in the art will appreciate from this disclosure that device elements, as well as materials, shapes and dimensions of device elements, as well as methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention.

What is claimed is:

1. A sunshade for a vehicle comprising:

a shade body defining a perimeter and having first and second major surfaces, the shade body being configured for detachable positioning inside a window of the vehicle such that, when installed, the shade body defines an upper edge, a lower edge, a vertical direction, and a horizontal direction, the shade body comprising a filler material and at least one outer lining;

the shade body defining a plurality of sub panels, each of the plurality of sub panels being connected to another of the sub panels by a fold section that forms a flexible joint such that the shade body includes a plurality of flexible joints, the sunshade includes a plurality of seams therein, at least some of the plurality of seams defining a portion of a sub-panel perimeter by pulling the first and second major surfaces closer together therealong;

wherein the shade body is foldable and unfoldable between a first, extended, in use configuration and a second, compact, storage configuration;

the shade body further comprising a pocket extending in in the vertical direction and located adjacent to one of the plurality of flexible joints, the pocket defining a channel therein;

a reinforcement member located in the channel of the pocket to provide stiffness to the sunshade such that when the sunshade is in the first, extended, in use, configuration and installed generally adjacent to an inner surface of the window of the vehicle the sunshade is resistant to buckling inwardly away from the inner surface of window;

wherein at least one of the plurality of flexible joints comprises:

one of the plurality of seams forming one of two parallel edges of an elongated chamber which extends in the vertical direction between the lower edge and the upper edge, the chamber having the filler material therein;

the other of the two parallel edges of the elongated chamber formed by an inward indentation in the first major surface which extends linearly in the vertical direction and is spaced from the one of the plurality of seams that forms the one of the two parallel edges to form opposing lateral sides of the flexible joint; and wherein the one of the plurality of seams that forms the one of the two parallel edges also extends through a lateral side of the pocket in a vertical secures the lateral side of the pocket and brings the first and second major surfaces of the shade body closer together to form one of the lateral sides of the flexible joint that includes the filler material therein.

2. The sunshade of claim 1, wherein the reinforcement member is an elongated metallic member having opposing axial ends and extending over a majority of a height of the shade body, the elongated metallic member being foldable such that the elongated metallic member can be folded toward itself by bending about a horizontal axis of the shade body to bring the opposing axial ends closer together.

3. The sunshade of claim 1, wherein the reinforcement member has a cross-section in the horizontal direction that is arcuate.

4. The sunshade of claim 3, wherein the first major surface is reflective such that when the sunshade is in the first, extended, in-use configuration with the sunshade adjacent to the inner surface of the window with the first major surface facing the inner surface of the window, some solar radiation can be directed out of the vehicle to assist with keeping an interior of the vehicle cooler than if the first major surface were not reflective.

5. The sunshade of claim 4, wherein when viewing the first major surface while the sunshade is in the first, extended, in-use configuration the reinforcement member is oriented to be concave to the viewer.

6. The sunshade of claim 5, wherein the sunshade comprises a plurality of the pockets each having its own reinforcement member therein.

7. The sunshade of claim 6, wherein the filler material of the shade body extends, in the horizontal direction, completely through the flexible joint.

8. The sunshade of claim 2, wherein the reinforcement member has a cross-section in the horizontal direction that is arcuate.

9. The sunshade of claim 8, wherein the reinforcement member has a generally W-shaped horizontal cross-section.

10. The sunshade of claim 9, wherein the filler material is polymer.

11. The sunshade of claim 1, wherein the filler material is polymer.

12. The sunshade of claim 11, wherein the flexible joint includes a second inward indentation in the second major surface which is aligned and opposes the inward indentation in the first major surface.

13. The sunshade of claim 1, wherein the reinforcement member has a generally W-shaped horizontal cross-section.

14. The sunshade of claim 1, wherein the reinforcement member has a corrugated horizontal cross-section.

15. The sunshade of claim 1, wherein the reinforcement member has a generally flat shade support side which is configured to abut the shade body such that when viewed in horizontal cross-section, the generally flat shade support side forms a perimeter of the reinforcement member and a remainder of the perimeter is formed by an arcuate shape, at least one elongated hollow being defined within the reinforcement member.

16. The sunshade of claim 1, wherein the reinforcement member has a generally rectilinear horizontal cross-section with a plurality of elongated hollows located therein.

17. A sunshade for a vehicle comprising:

a shade body defining a perimeter and having first and second major surfaces, the shade body being configured for detachable positioning inside a window of the vehicle such that, when installed, the shade body defines an upper edge, a lower edge, a vertical direction, and a horizontal direction, the shade body comprising a filler material and at least one outer lining;

the shade body defining a plurality of sub panels, each of the plurality of sub panels being connected to another of the sub panels by a fold section that forms a flexible joint such that the shade body includes a plurality of flexible joints, the sunshade includes a plurality of seams therein, at least some of the plurality of seams defining a portion of a sub-panel perimeter by pulling the first and second major surfaces closer together therealong;

wherein the shade body is foldable and unfoldable between a first, extended, in use configuration and a second, compact, storage configuration;

the shade body further comprising a reinforcement member located in a pocket provided on the shade body to provide stiffness to the sunshade such that when the sunshade is in the first, extended, in use, configuration and installed generally adjacent to an inner surface of the window of the vehicle the sunshade is resistant to buckling inwardly away from the inner surface of window;

wherein when viewing the first major surface while the sunshade is in the first, extended, in-use configuration the reinforcement member is oriented to be concave to the viewer; and wherein at least one of the plurality of flexible joints comprises:

one of the plurality of seams forming one of two parallel edges of an elongated chamber which extends in the vertical direction between the lower edge and the upper edge, the chamber having the filler material therein;

the other of the two parallel edges of the elongated chamber formed by an inward indentation in the first major surface which extends linearly in the vertical direction and is spaced from the one of the plurality of seams that forms the one of the two parallel edges to form opposing lateral sides of the flexible joint; and wherein the one of the plurality of seams that forms the one of the two parallel edges also extends through a lateral side of the pocket in a vertical direction such that the seam both secures the lateral side of the pocket and brings the first and second major surfaces of the shade body closer together to form one of the lateral sides of the flexible joint that includes the filler material therein.

18. The sunshade of claim 17, wherein the reinforcement member has a generally W-shaped horizontal cross-section.

19. The sunshade of claim 17, wherein the reinforcement member has a corrugated horizontal cross-section.

20. A sunshade for a vehicle comprising:

a shade body defining a perimeter and having first and second major surfaces, the shade body being configured for detachable positioning inside a window of the vehicle such that, when installed, the shade body defines an upper edge, a lower edge, a vertical direction, and a horizontal direction, the shade body comprising a filler material;

the shade body defining a plurality of sub panels, each of the plurality of sub panels being connected to another of the sub panels by a fold section that forms a flexible joint such that the shade body includes a plurality of flexible joints, the sunshade includes a plurality of seams therein, at least some of the plurality of seams defining a portion of a sub-panel perimeter by pulling the first and second major surfaces closer together therealong;

wherein the shade body is foldable and unfoldable between a first, extended, in use configuration and a second, compact, storage configuration;

the shade body further comprising a reinforcement member extending vertically and located in a pocket provided on the shade body to provide stiffness to the sunshade such that when the sunshade is in the first, extended, in use, configuration and installed generally adjacent to an inner surface of the window of the vehicle the sunshade is resistant to buckling inwardly away from the inner surface of window;

wherein the reinforcement member has a horizontal cross section that is arcuate; and wherein at least one of the plurality of flexible joints comprises:

one of the plurality of seams forming one of two parallel edges of an elongated chamber which extends in the vertical direction between the lower edge and the upper edge, the chamber having the filler material therein;

the other of the two parallel edges of the elongated chamber formed by an inward indentation in the first major surface which extends linearly in the vertical direction and is spaced from the one of the plurality of seams that forms the one of the two parallel edges to form opposing lateral sides of the flexible joint; and wherein the one of the plurality of seams that forms the one of the two parallel edges also extends through a lateral side of the pocket in a vertical direction such that the seam both secures the lateral side of the pocket and brings the first and second major surfaces of the shade body closer together to form one of the lateral sides of the flexible joint that includes the filler material therein.

\* \* \* \* \*